Sept. 6, 1932.  H. GABRIELS, JR  1,875,438
FAUCET GASKET
Filed Jan. 3, 1931
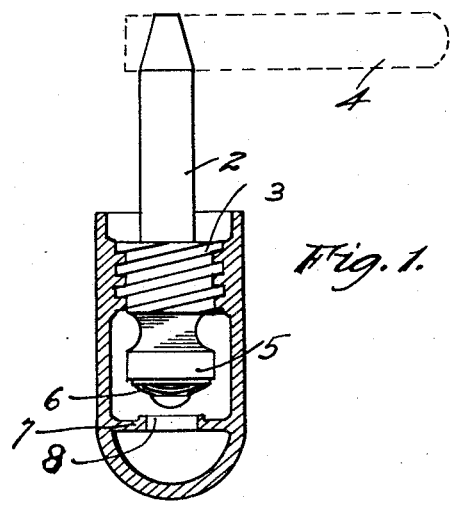
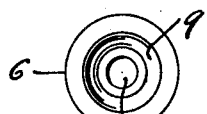
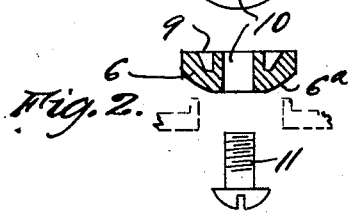
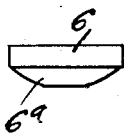
INVENTOR,
Henry Gabriels, Jr.;
BY
F. E. Maynard
ATTORNEY Patented Sept. 6, 1932

1,875,438

UNITED STATES PATENT OFFICE

HENRY GABRIELS, JR., OF LOS ANGELES, CALIFORNIA

FAUCET GASKET

Application filed January 3, 1931. Serial No. 506,371.

This invention relates to faucets, and more particularly to what are known as bib-cocks.

It is an object of the present invention to provide a faucet closure stem having, in combination, a peculiar, deformable washer opposeable to a complementary seat in the faucet chamber, and more particularly to provide a washer with a rear face having an annular groove designed to form a void to allow the rearward deformation of the crowned bottom or effective face of the washer or gasket as this is pressed to its opposing seat.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a side elevation of a conventional faucet closure stem with its applied closure gasket.

Figure 2 is an axial section of the improved gasket detached.

Figure 3 is a side elevation of the detached gasket, and

Figure 4 is a plan of the top or grooved face of the gasket.

In its illustrated embodiment, the faucet stem 2, having the usual worm 3 and handle 4, is provided with an end closure or rigid disc 5, recessed to form a shallow chamber for a circular washer or gasket 6 of such diameter and thickness as to snugly fit in the recess provided in the bottom of the closure or cup 5.

Such faucet washers are made of medium hardness rubber, so as to effectively seat on an opposed closure seat 7, having a slight annular, raised lip or bead 8, onto which the rubber gasket 6 is forced by the stem screw 3, when the stem is turned. Usually, the bottom or effective face of the gasket 6 is crowned or convexed as at 6ª, and the top surface is flat and adapted to seat firmly against the bottom of the recess closure 5.

A feature of the present invention consists in the provision of an annular groove or chamber 9, surrounding the usual screw hole 10 for the fastening screw 11, Fig. 2. The annular groove 9 has a mean diameter somewhat less than the mean diameter of the opposed valve seat bead 8, so that when the closure 5 is forced down, the gasket face 6ª meets the rib 8 and due to the designed deformation inwardly of the somewhat hollowed body of the gasket 6, it will be seen that the water flow will be effectively cut off without subjecting the gasket to an excess degree of pressure, since the deformation of the gasket permitted by the annular chamber 9 allows the gasket to effectively and readily conform to the opposing seat bead 8 in shutting-off action.

The expert on rubber gaskets is aware that the so-called hard rubber washer does not possess the desired degree of mobility, and tends to wear and score while, on the other hand, a rather pure and soft rubber will give way under the effect of hot water and tends to chatter when the valve is closed. In the present invention, the gaskets are made of a rubber having a desired degree of rigidity to provide for length of life and the desired degree of flexibility is secured by the provision of the cushion chamber or groove of the gasket.

It is understood that the invention may be incorporated in washers of either the flat or crowned bottom face type.

When the gasket is placed in the cup 5 and set by the screw 11 it seals the chamber 9 and pockets air which though allowing deformation of the rubber still affords desirable resistance.

The invention claimed is:

A deformable, rubber gasket, adapted to be seated in a faucet, stem-end cup which has a smooth imperforate gasket seat, said gasket having a deep annular groove in its face which seats in the cup part; whereby when the gasket is compressed it contracts the groove and forms therein an air compression chamber acting to resist gasket deformation.

HENRY GABRIELS, Jr.